United States Patent [19]

Ernst

[11] Patent Number: 4,736,140
[45] Date of Patent: Apr. 5, 1988

[54] CONTROL DEVICE FOR A CONTROLLED AND VARIABLE SPEED MOTOR BY MEANS OF A STEPPING MOTOR

[76] Inventor: Marc Ernst, 63 avenue de Flandre, 59170 Croix, France

[21] Appl. No.: 891,944

[22] Filed: Jul. 30, 1986

[30] Foreign Application Priority Data

Jul. 30, 1985 [FR] France .............................. 85 11977

[51] Int. Cl.[4] .............................................. H02P 5/46
[52] U.S. Cl. ....................................... 318/77; 318/480
[58] Field of Search ................ 318/68, 77, 138, 254, 318/430, 480, 66; 250/200, 345, 570

[56] References Cited

U.S. PATENT DOCUMENTS

| | | | |
|---|---|---|---|
| 3,117,266 | 1/1964 | Raymond | 318/480 X |
| 3,193,744 | 7/1965 | Seward | 318/480 X |
| 3,196,279 | 7/1965 | Papelian | 250/570 X |
| 3,388,303 | 6/1968 | Rommel | 318/480 X |
| 3,786,236 | 1/1974 | Sato et al. | 250/570 |
| 3,795,852 | 3/1974 | Favard | 318/480 X |
| 4,240,066 | 12/1980 | Lenox | 250/570 X |

FOREIGN PATENT DOCUMENTS 58-144593 8/1983 Japan .................................. 318/480

*Primary Examiner*—Bentsu Ro
*Attorney, Agent, or Firm*—Frost & Jacobs

[57] ABSTRACT

The present invention relates to a control device for a reversible and variable speed motor by means of an optoelectronic system controlled by a stepping motor characterized in that it comprises two disks, the first disk being integral with the motor, or with the controlled mechanical set-up, and divided in zones transparent to light, each of these zones corresponding to a function of the drive system (shut-down-start-up-acceleration-hyperacceleration-STOP-emergency), the second disk comprising zones that are luminous or that allow light to pass, which face the zones of the first disk, and being driven by the stepping motor, photoelectric cells arranged in concentric circles receiving light (from their own zone) behind the first disk, a source of illumination in front of the second disk and facing each zone (there are, therefore, as many concentric circles as there are zones).

8 Claims, 3 Drawing Sheets

4,736,140

CONTROL DEVICE FOR A CONTROLLED AND VARIABLE SPEED MOTOR BY MEANS OF A STEPPING MOTOR

FIELD OF THE INVENTION

The present invention relates to the control of any electrical motor, reversible and of variable speed, by the intermediary of an optoelectronic system controlled by a stepping motor.

BACKGROUND OF THE INVENTION

It is customary to control direct current motors by systems using either a speed sensor, or an incremental system. Upon the command, a comparison is effected between the speed and the number of rotations of the direct current motor with the program initially predetermined. This system relates to a clock and operates either by analog calculation, or by digital calculation, in feed-back.

GENERAL DESCRIPTION OF THE INVENTION

The present invention therefore relates to a control device for a reversible and variable speed motor by means of an opto-electronic system controlled by a stepping motor characterized in that it comprises two disks, the first disk being integral with the motor, or with the controlled mechanical set-up, and divided in zones transparent to light, each of these zones corresponding to a function of the drive system (shut-down start-up—acceleration—hyperacceleration—STOP—emergency), the second disk comprising zones that are luminous or that allow light to pass, which face the zones of the first disk and being driven by the stepping motor, photoelectric cells arranged in concentric circles receiving light (from their own zone) behind the disk, a source of illumination in front of the disk and facing each zone (there are, therefore, as many concentric circles as there are zones).

According to a particular characteristic of the invention the zones are of proportional transmission either by a grading device, or by a variable width.

In the process which is an object of the present invention, the motors are controlled digitally in feed-back mode.

Other characteristics and advantages of the invention will become apparent upon reading of the following description of a non-limiting embodiment of the invention, with reference to the appended diagrams.

DESCRIPTION OF THE PREFERRED EMBODIMENTS

The reversible and variable speed motor, (or the shaft driven by the motor, after, for example, a reducer), drives a disk (No. 1—FIG. 1) allowing passage at certain points of visible (or infrared) radiation.

The zones of light transmission are the following:

Zone 1 shut-down zone: actuating, for example, a magnetic brake or a declutching of the actuating set-up and interrupting the current powering the motor.

Zone 2 zone for clockwise start-up of the motor.

Zone 3 zone for counterclockwise start-up of the motor.

Zone 4 zone for acceleration of the motor related to the preceding starting zone.

Zone 5 maximum acceleration: in the same direction as the preceding zone.

Zone 6 zone for emergency shut-down. STOP.

The motor must never enter this zone which interrupts all power, leaving only safety devices.

Zones 2, 3, 4, and 5 control the motor by acting on the tension, or the frequency, or on the magnetic, hydraulic or mechanical clutch slippage in order to vary the speed of the motor.

Figure 1:
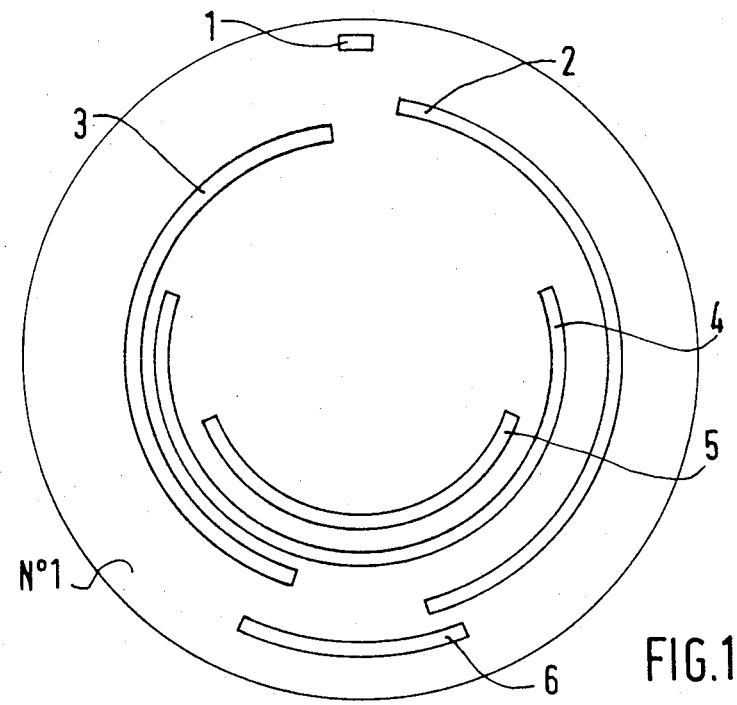
FIG. 1 is a view from above of the disk driven by the power motor.
Figure 2:
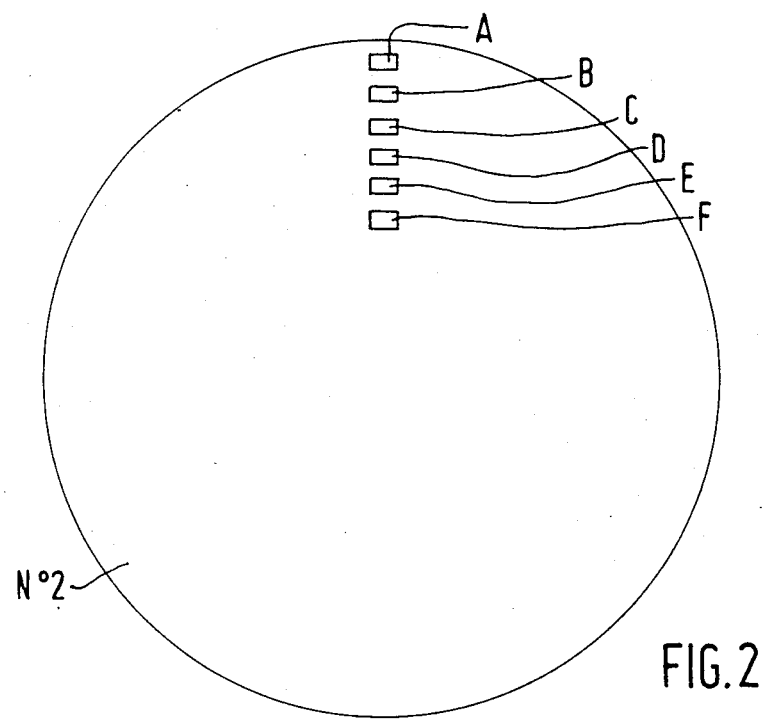
FIG. 2 is a view of the disk driven by the stepping motor.
Figure 3:
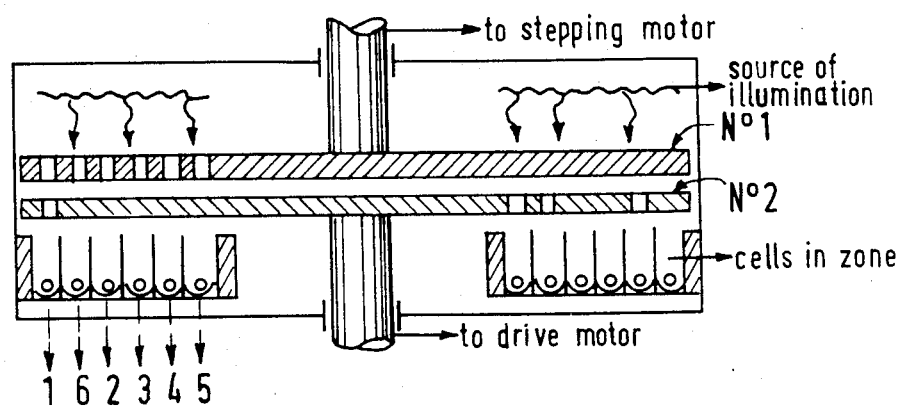
FIG. 3 is a section of the device of the invention.

Facing the disk of FIG. 1 is a disk (No. 2—FIG. 2) which comprises six zones (A to F) facing each zone of the preceding disk. Each of these zones emits (or transmits) a luminous flux which is intercepted by disk No. 1. Disk No. 2 is driven by a stepping motor. The control of this stepping motor is established either by computer, or by programmable automated means, or by any other known means.

Figure 4:
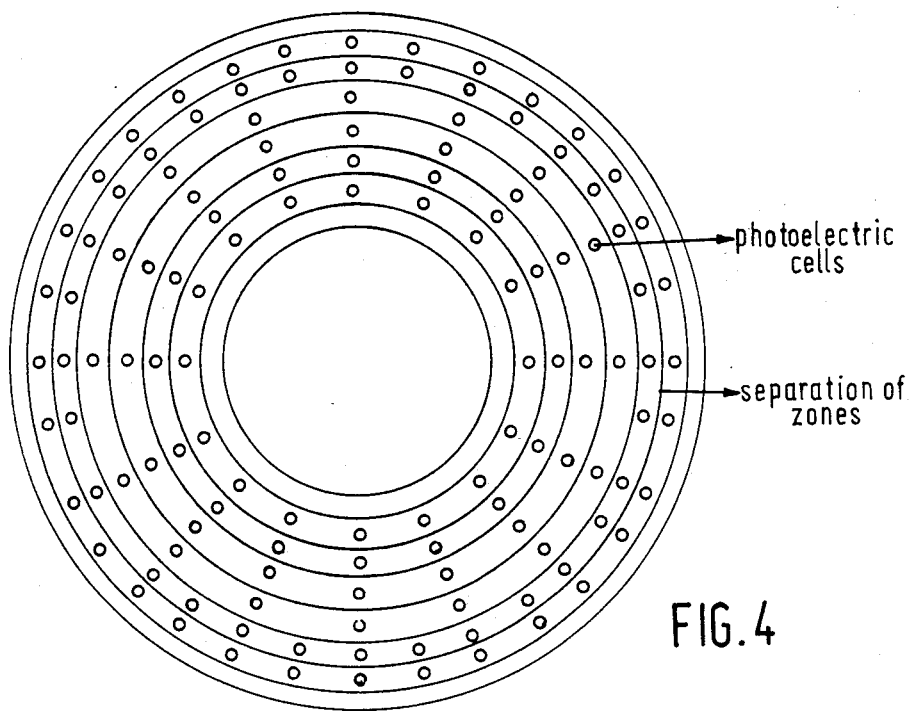
FIG. 4 shows the photoelectric cell sensors for light transmitted through the specific zones.

When the two disks are facing one another and disk No. 2 is stopped facing disk No. 1, the position of the illuminating zones faces zone 1, corresponding to the shut-down position of the motor (FIG. No. 3). Behind disk 2 is the light source and before disk 1 are the photoelectric cells arranged in concentric circles (FIG. 4) detecting the transmitted luminous flux, six rings corresponding to zones 1 to 6.

When the stepping motor displaces disk No. 2 in a clockwise direction, zone A no longer illuminates zone 1 of disk 1, but zone C begins to illuminate zone 2 which actuates start-up of the motor in a clockwise direction. While the stepping motor continuing to rotate, the variable speed motor starts to move and zone 2 continues to be illuminated. Increasing the speed of the stepping motor would increase the speed of disk No. 2 and zone 4 in turn receives the light from zone E which triggers the acceleration. Subsequently, zone 5 is illuminated by zone F leading to maximum acceleration in a clockwise direction, and finally, zone 6 which places the set-up in a state of emergency shut-down blocking the stepping motor and the power unit.

Likewise, when the stepping motor actuates disk 2 in a counterclockwise direction, zone 3 is illuminated by zone D which results in the motor rotating in the opposite direction. Zone 4 is then illuminated triggering acceleration, then zone 5, then zone 6.

Zones 4 and 5 trigger acceleration and maximal acceleration in the same direction as zones 2 or 3. It is clear that when the stepping motor rotates, this obliges the controlled motor to follow exactly the number of turns of the stepping motor. This system has the advantage of using the operation of the stepping motor without restriction (the drive disk being of very small mass) hence unable "to skip a step". It is clear that each zone from 2 to 5 should be preset as a function of the load of the motor and its power supply (direct, alternating, three-phase current, etc.).

Figure 5:
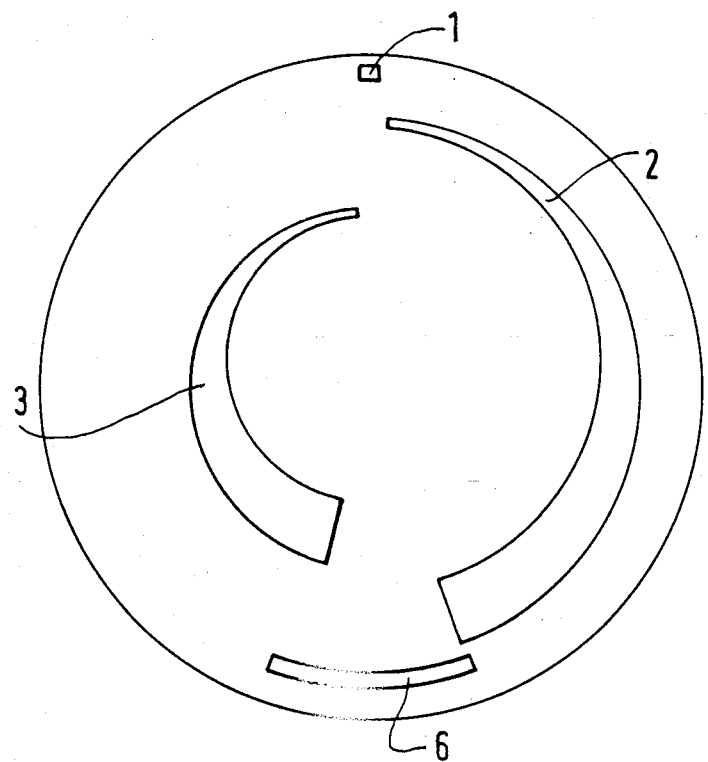
FIG. 5 shows a variant of the disk driven by the power motor.

Another way of operating consists in only using zones 1, 2, 3, and 6. Zones 1 and 6 receive all or no light, whereas zones 2 and 3 detect light coming from zones C and D of disk 2 in a proportional way: either by a grading, or by a variable width (FIG. 5). Acceleration of the motor is proportional to the light received by virtue of an analog converter, of the luminous intensity detected, controlled by the motor power.

In order to preserve the zero position of the stepping motor at shut-down (zone A should be facing zone 1), a braking mechanism is envisaged which is automatically triggered upon shut-down of the system, that is when the stepping motor is no longer powered.

The disk usually controlled by the stepping motor can be driven either by hand or by any motive means.

What I claim is:

1. A control device having a driver system for operating a reversible and variable speed motor by means of an optoelectronic system controlled by a stepping motor characterized in that it comprises two disks, the first disk being integral with the variable speed motor and divided in zones transparent to light, each of these zones corresponding to a function of the driver system (shut-down—start-up—acceleration—maximum acceleration—STOP—emergency), the second disk comprising light emitting zones facing the zones of the first disk, and being driven by the stepping motor, photoelectric cells arranged in concentric circles and behind the first disk, each circle of said photoelectric cells receiving light from the respective light emitting zone of the second disk, a static light source in front of the second disk and facing each light emitting zone, whereby there are as many concentric circles as there are light emitting zones.

2. The control device according to claim 1, wherein the disk usually controlled by the stepping motor is driven by hand.

3. The control device according to claim 1, wherein said light emitting zones of the second disk are luminous.

4. The control device according to claim 1, wherein said light emitting zones of the second disk allow the passage of light therethrough.

5. A control device having a drive system for operating a reversible and variable speed motor by means of an optoelectronic system controlled by a stepping motor, characterized in that it comprises two disks, the first disk being integral with the variable speed motor and divided in zones transparent to light and of proportional transmission by a variable width, each of these zones corresponding to a function of the drive system (shut-down—start-up—acceleration—maximal acceleration—STOP—emergency), the second disk comprising light emitting zones facing the zones of the first disk, and being driven by the stepping motor, photoelectric cells arranged in concentric circles and behind the first disk, each circle of said photoelectric cells receiving light from the respective light emitting zone of the second disk, a light source in front of the second disk and facing each light emitting zone, whereby there are as many concentric circles as there are light emitting zones.

6. The control device according to claim 5, wherein the disk usually controlled by the stepping motor is driven by hand.

7. The control device according to claim 5, said light emitting zones of the second disk being luminous.

8. The control device according to claim 5, said light emitting zones of the second disk allowing the passage of light therethrough.

* * * * *